United States Patent [19]

Harvey et al.

[11] Patent Number: 5,601,437
[45] Date of Patent: Feb. 11, 1997

[54] CLOCKSPRING WITH CENTERING DISPLAY DEVICE

[75] Inventors: Jeffery A. Harvey, Warren, Mich.; Gerald L. McClure, Hamilton, Ill.

[73] Assignee: Methode Electronics, Inc., Chicago, Ill.

[21] Appl. No.: 324,776

[22] Filed: Oct. 17, 1994

[51] Int. Cl.⁶ ..................................................... H01R 39/00
[52] U.S. Cl. .............................................. 439/15; 439/164
[58] Field of Search ............................... 439/164, 15, 13, 439/11

[56] References Cited

U.S. PATENT DOCUMENTS

| | | | |
|---|---|---|---|
| 4,789,342 | 12/1988 | Shitanoki | 439/15 |
| 4,821,016 | 4/1989 | Zeller et al. | 307/10.1 |
| 4,867,688 | 9/1989 | Suzuki | 439/15 |
| 4,875,860 | 10/1989 | Suzuki | 439/15 |
| 4,921,428 | 5/1990 | Sasaki et al. | 439/15 |
| 5,010,784 | 4/1991 | Nakazato et al. | 74/498 |
| 5,061,195 | 10/1991 | Bolen | 439/164 |
| 5,127,841 | 7/1992 | Bannai et al. | 439/164 |
| 5,171,153 | 12/1992 | Kubota et al. | 439/15 |
| 5,171,157 | 12/1992 | Bolen | 439/164 |
| 5,238,420 | 8/1993 | Miyahara et al. | 439/15 |
| 5,314,344 | 5/1994 | Ida et al. | 439/164 |
| 5,429,517 | 7/1995 | Bolen | 439/15 |

*Primary Examiner*—David L. Pirlot
*Attorney, Agent, or Firm*—David L. Newman

[57] ABSTRACT

A clockspring having a device for determining if the clockspring is centered. The clockspring has a housing defining a first central aperture and the housing also has a radial wall, a hub is carried in rotatable relation in the first central aperture, a coiled ribbon cable having a first end and a second end with the first end being connected to a first connector carried by the housing, and the second end of the coiled ribbon cable being connected to a second connector carried by the hub, the hub being rotatable only a maximum number of revolutions before said coiled conducting means becomes completely wrapped or unwrapped around the hub, a pawl mounted to the hub, a counter wheel rotatably attached to the housing and having a plurality of teeth which extend from the counter wheel for incremental engagement with the pawl, the plurality of teeth being equal in quantity to the maximum number of hub revolutions, each tooth being labeled to indicate the amount and the direction of hub rotation needed for centering the hub with respect to the housing, a wave washer frictionally mounted against the housing and the counter wheel, a counter cover is mounted over the counter wheel so that no more than two teeth from the counter wheel are exposed at any given time.

22 Claims, 2 Drawing Sheets

CLOCKSPRING WITH CENTERING DISPLAY DEVICE

BACKGROUND OF THE INVENTION

The present invention relates to a clockspring which electrically connects a stationary housing to a rotatable hub by means of a flat ribbon cable, and in particular to an apparatus which is capable of indicating if the hub is centered with respect to the housing.

Clocksprings are typically used in applications such as connecting an air bag, mounted in the steering wheel of an automobile, to sensors mounted within various locations of the automobile.

For example, U.S. Pat. No. 5,061,195 (1991), issued to Bolen, discloses a type of clockspring providing a direct electrical connection between relatively movable members in the steering apparatus of an automobile. In this type of clockspring construction, a ribbon cable is used to provide the electrical connection. The ribbon cable is constructed of conductive material which is sandwiched between two layers of mylar. The cable is loosely accommodated in a coiled state within the clockspring's housing. In addition, one end of the cable is attached to the clockspring's stationary member and the other end of the cable is attached to the clockspring's rotatable hub.

In operation, the ribbon cable will either wrap or unwrap around the hub when the hub is rotated. However, in order to prevent the cable from being damaged during rotation of the hub, no substantial tensile force is allowed to be applied to the ribbon cable while it is wrapping or unwrapping. An overwound condition is the to occur if the hub is rotated so far in one direction that it results in a significant amount of tensile force being applied to the cable.

In order to prevent excess tensile force from being applied to the cable, it is necessary for the hub to be centered when it is mounted on the steering apparatus. Centering of the hub allows for the same extent of clockwise and counterclockwise rotation of the hub before the ribbon cable becomes overwound.

If the hub is not in the centered position when the clockspring is mounted on the steering apparatus, then the cable will be damaged when it is completely wrapped and/or unwrapped around the hub, but yet the steering apparatus is still allowed to continue to turn.

To ensure that the clockspring is centered when it is mounted on the steering apparatus, external locking mechanisms are sometimes used. These locks allow only limited rotational travel of the hub prior to the clockspring's installation. The external lock is disengaged by simply removing it from the clockspring and discarding it.

Likewise, internal locking mechanism are also sometimes used in order to prevent rotation of the hub such as U.S. Pat. No. 5,171,157 (1992), issued to Bolen. An internal lock limits the travel of the hub whenever the clockspring is not mounted to the steering apparatus. The internal lock is usually disengaged by a pin or other unlocking system provided by the steering apparatus. The clockspring's lock will reengage whenever the clockspring is removed from the steering apparatus.

However, if the hub is removed from the steering apparatus and then subsequently reinstalled, both the external lock and the internal lock fail to ensure and/or indicate when the clockspring's hub is centered.

Many devices have been proposed which provide a way of indicating if the clockspring's hub is centered. However, these devices cause an increase in the diametrical size of the clockspring and/or require the use of gears which have a very limited useful life due to their constant rotating whenever the hub rotates.

For example, U.S. Pat. No. 4,789,342 (1988), issued to Shitanoki, discloses a position indicator which is mounted on the side of the clockspring. Likewise, U.S. Pat. No. 4,821,016 (1989), issued to Zeller et al., discloses an indicator having a plurality of gears which rotate whenever the hub rotates.

Therefore, a centering display device is proposed which has a counter wheel, axially supported on the top of the housing, and a pawl, provided on the hub, which engages the counter wheel when the hub revolves. This device thereby enables centering of the hub and housing members. The device does not, however, increase the diametrical size of the clockspring and/or require the continued engagement of two or more gear members.

In view of the above, it is an object of the present invention to indicate when the hub is centered within the clockspring housing.

A further object of the invention is to provide a centering display without increasing the diametrical size of the clockspring.

An added object of the invention is to provide a centering display device having a high reliability.

Another object of the invention is to indicate the direction that the hub must be rotated in order to position it into a center position within the clockspring housing.

It is also an object of the invention to indicate the number or turns required to position the hub into the centered position.

In addition, it is an object of the invention to reduce or eliminated the possibility of the occurrence of an overwound condition.

SUMMARY OF THE INVENTION

The present invention provides an apparatus for centering a clockspring. To this end, in an embodiment, the present invention provides a clockspring having a housing with an outer radial wall and a top which extends perpendicularly from the outer radial wall, a hub rotatably mounted to the housing, a ribbon cable coiled around the hub and connected to the housing and the hub, and an indicator, contained on both the top of the housing and the hub, for incrementally indicating when the hub is centered with respect to the housing.

In an embodiment, the present invention provides that the indicator is a counter wheel and a pawl.

In an embodiment, the present invention provides that the counter wheel is rotatably attached to the top of the housing and the pawl is mounted to the hub.

In an embodiment, the present invention includes frictional means for preventing the counter wheel from rotating unless it is engaged by the pawl.

In an embodiment, the present invention provides that the frictional means is a wave washer mounted against the top of the housing and the bottom of the counter wheel.

In an embodiment, the present invention provides for a plurality of teeth which extend from the counter wheel for incremental engagement with the pawl.

In an embodiment, the present invention provides that the plurality of teeth are equal in quantity to the maximum number or hub revolutions possible before the ribbon cable becomes completely wrapped or unwrapped around the hub.

In an embodiment, the present invention provides that each tooth is labeled to indicate the amount and the direction of hub rotation needed for centering the hub with respect to the housing.

In an embodiment, the present invention further includes a counter cover mounted over the counter wheel so that no more than two teeth from the counter wheel are exposed at any given time.

The present invention further provides a clockspring having a device for determining if the clockspring is centered, the clockspring including a housing defining a first central aperture and the housing also having a radial wall, a hub being carried in rotatable relation in the first central aperture, coiled conducting means having a first end and a second end with the first end being connected to a first connector carried by the housing, and the second end of the coiled conducting means being connected to a second connector carried by the hub, and an indicator, mounted to the hub and the housing, without extending onto the radial wall, for indicating if the hub is centered with respect to the housing.

The present invention further provides a clockspring having a device for determining if the clockspring is centered, the clockspring includes a housing defining a first central aperture and the housing also having a radial wall, a hub being carried in rotatable relation in the first central aperture, coiled conducting means having a first end and a second end with the first end being connected to a first connector carried by the housing, and the second end of the coiled conducting means being connected to a second connector carried by the hub, a pawl mounted to the hub, a counter wheel rotatably attached to the housing and having a plurality of teeth which extend from the counter wheel for incremental engagement with the pawl, each tooth being labeled to indicate the amount and the direction of hub rotation needed for centering the hub with respect to the housing, a wave washer frictionally mounted against the housing and the counter wheel, and a counter cover mounted over the counter wheel so that no more than two teeth from the counter wheel are exposed at any given time.

Various means for practicing the invention and other advantages and novel features thereof will be apparent from the following detailed description of an illustrative preferred embodiment of the invention.

BRIEF DESCRIPTION OF THE DRAWINGS

There is shown in the drawings a presently preferred embodiment of the present invention, wherein like numerals in the various figures pertain to like elements, and wherein.

DETAILED DESCRIPTION OF THE PRESENTLY PREFERRED EMBODIMENTS

Figure 1:
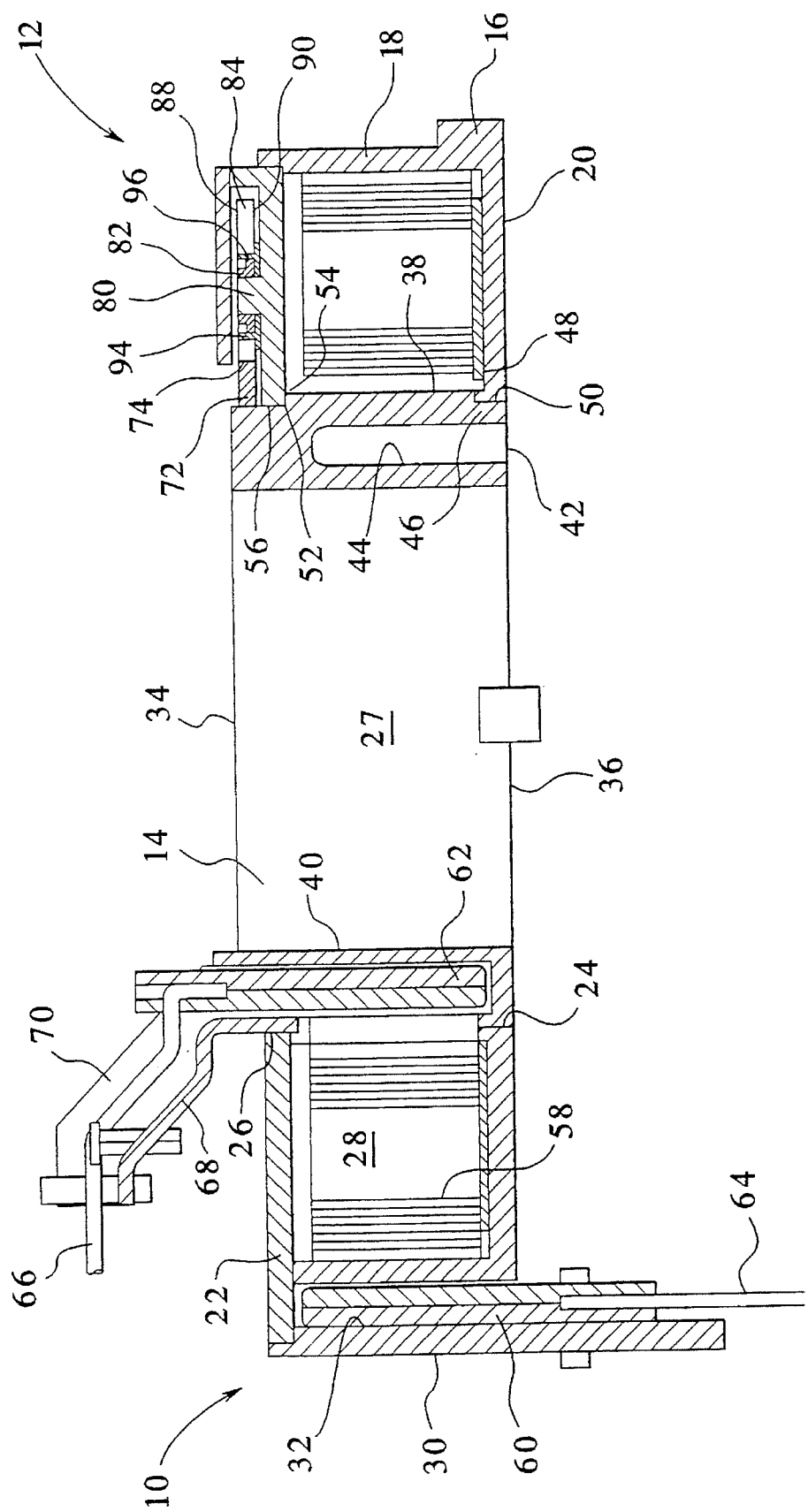
FIG. 1 is a cross-sectional side view of a clockspring employing a centering display device.

Referring to the drawings, and particularly to FIG. 1, a cross-sectional view of a clockspring 10 is depicted having a centering display device 12.

The clockspring 10 comprises of a hub 14 and a housing 16. The housing 16 consists of an outer radial wall 18 which is perpendicularly attached to a base 20 and a top 22.

The base 20 of the housing 16 is generally circular in shape with a first aperture 24 located in its center. Likewise, the top 22 of the housing 16 is generally circular in shape with a second aperture 26 located in its center and the aperture 26 having a circumference equal to that of the first aperture 24. Together, the first aperture 24 and the second aperture 26 provide for a first central aperture 27 which extends through the housing 16 of the clockspring 10. In addition, the base 20, outer radial wall 18, and the top 22 of the housing 16 combine to define a circular channel 28 contained within the housing.

Extending outwardly from a portion of the outer radial wall 18 of the housing 16 is a partially extending radial wall 30. The extending radial wall 30 separates from the outer radial wall 18 so as to create a first connector containment cavity 32 within the housing 16. A passage (not shown) is provided between the first connector containment cavity 32 and the circular channel 28.

Rotationally mounted within the first central aperture 27 of the housing is the hub 14. The hub 14 includes a top 34, a bottom 36, and a second radial wall 38. Positioned within the center of the hub 14 is a second central aperture 40 which extends through the top 34 of the hub to the bottom 36 of the hub. In addition, situated within the bottom 36 of the second radial wall 38 is an opening 42 to a pin cavity 44 located within the second radial wall 38.

The second radial wall 38 of the hub 14 has an outer circumference which is greater than that of both the second aperture 26 and first aperture 24. Positioned between the second radial wall 38 and the bottom 36 of the hub 14 is a bottom race 46. The bottom race 46 has a lip 48 which extends inwardly and perpendicularly from the outside of the second radial wall 38 and adjoins to a bottom race wall 50. Correspondingly, the bottom race wall 50 extends perpendicularly from the lip 48 and advances to the bottom 36 of the hub 14. The bottom race wall 50 surrounds the hub 14 with a circumference equal to that of the first aperture 24 in the housing's base 20.

Likewise, situated between the second radial wall 38 and the top 34 of the hub 14 is a top race 52. The top race 52 has a lip 54 which extends inwardly and perpendicularly from the outside of the second radial wall 38 and abuts a top race wall 56. Correspondingly, the top race wall 56 extends perpendicularly from the lip 54 and advances to the top 34 of the hub 14. The top race wall 56 surrounds the hub 14 with a circumference equal to that of the second aperture 26 in the housing's top 22.

As previously stated, the clockspring's hub 14 is rotationally mounted within the first central aperture 27 of the housing 16. The top race wall 56 of the hub 14 slides within the second aperture 26 and against the top 22 of the housing 16. Likewise, the bottom race wall 50 slides within the first aperture 24 and against the base 20 of the housing 16. In addition, the second radial wall 38 of the hub 14 partially protrudes within the channel 28 of the housing 16. Therefore, the hub 14 is locked within the housing 16 because the portion of the second radial wall 38 which extends into the channel 28 has a larger circumference than both the first aperture 24 and the second aperture 26 of the housing 16.

Within the housing's channel 28 and surrounding the hub 14 is a coiled ribbon cable 58. The ribbon cable 58 has a first end and a second end. The first end of the ribbon cable 58 threads through the passage provided between the first connector containment cavity 32 and the channel 28. The first end of the cable 58 is conductively attached to a first connector 60 located within the cavity 32. The first connector 60 extends out of the cavity 32 and through the base 20 of the housing 16. Likewise, the second end of the ribbon cable 58 is conductively attached to a second connector 62. The second connector 62 mounts partially into the second radial wall 38 of the hub 14 and protrudes through the top 34 of the hub.

Extending from the first connector 60 to the outside of the clockspring 10 is a first wire harness 64. The first wire harness 64 is conductively attached to the first connector 60 and thus carries electrical signals to and from the coiled ribbon cable 58. Likewise, extending from the second connector 62 to the outside of the clockspring 10 is a second wire harness 66. The second wire harness 66 is conductively attached to the second connector 62 and thus carries electrical signals to and from the coiled ribbon cable 58.

Also extending from the top 34 of the hub 14 is a harness guide 68. The harness guide 68 is positioned adjacent to where the second connector 62 exits the hub 14. The harness guide 68 angles over the top 22 of the housing 16 and provides a channel 70 within which the harness 66 is positioned.

Figure 2:
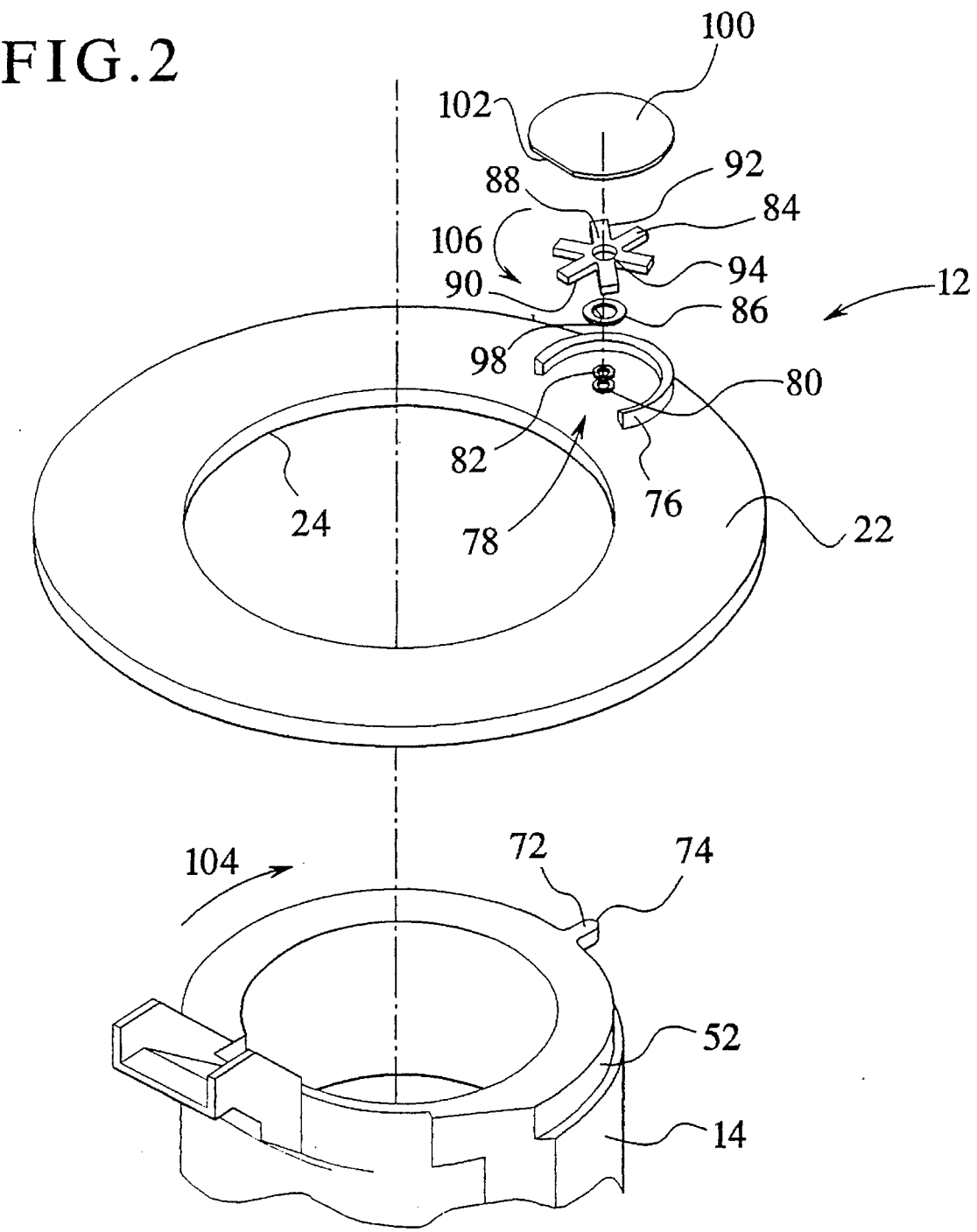
FIG. 2 is an exploded view of the centering display device.

Referring to both FIG. 1 and FIG. 2, attached to the top 22 of the housing and extending from the hub 14 is the centering display device 12. The portion of the centering display device 12 extending from the hub 14 is a pawl 72. The pawl 72 protrudes perpendicularly from the top race wall 52 of the hub 14 and has a first distal end 74. The first distal end 74 of the pawl 72 is rounded so as to form a blunt end.

In order for the hub 14 to rotate within the housing of the clockspring, it is necessary for the portion of the top race wall 52 which attaches to the pawl 72 to extend over the top 22 of the housing.

Turning to FIG. 2 where the top 22 is shown removed from the hub 14, formed on the top of the housing is a counter wall 76. The counter cover wall 76 is generally C-shaped with an opening 78 in the wall which faces the first aperture 24 in the top 22 of the housing.

Also extending from the top 22 of the housing is a mounting post 80. The mounting post 80 is positioned within the center of that area which is surrounded by the counter cover wall 76. The mounting post 80 is generally cylindrical in shape with one end connected to the top 22 of the housing and the other end having a flat head portion 82. The diameter of the flat head portion 82 is greater than the diameter of the mounting post 80.

Fitted onto the mounting post 80 is a counter wheel 84 and a wave washer 86. The counter wheel 84 is generally in the shape of a sprocket with a top 88, a bottom 90, a plurality of teeth 92, and a mounting hole 94 situated in the center of the wheel. The number of teeth 92 on the counter wheel 84 is determined by the amount of ribbon cable contained in the clockspring. In the presently preferred embodiment, the ribbon cable only allows the hub 14 to rotate a maximum of six revolutions in one direction before the cable becomes completely wrapped or unwrapped around the hub 14. Therefore, six teeth are provided on the counter wheel 84 which correspond to the maximum number of revolutions possible. In addition, the top 88 of the teeth 92 are labeled "1 Counter," "2 Counter," "3 Counter," "3 Clock," "2 Clock," and "1 Clock," respectively, when moving from one tooth to another in a clockwise direction (Labels on teeth are not depicted in FIG. 2).

As best depicted in FIG. 1, within the mounting hole 94 of the counter wheel 84 is a flange 96 which surrounds the circumference of the mounting hole 94 and reaches from the bottom 90 of the counter wheel 84 to approximately half way to the top 88 of the counter wheel. The flange 96 of the counter wheel 84 is rotationally mounted against the head portion 82 of the mounting post 80. Furthermore, the head portion 82 of the mounting post 88 is recessed within the mounting hole 94 of the counter wheel 84 so that it does not extend over the top 88 of the counter wheel.

Referring back to FIG. 2, the wave washer 86 has a mounting hole 98 positioned in its center and the washer has warped top and bottom frictional surfaces. The wave washer 86 is mounted on the mounting post 80 between the top 22 of the housing and the bottom 90 of the counter wheel 84. Therefore, the counter wheel will only rotate when force is applied against the teeth 92 of the wheel because of the friction provided by the wave washer against the bottom 90 of the counter wheel 84 and the top 22 of the housing.

Mounted over the counter wheel 84 and connected to the counter wall 76 is a counter cover 100. The counter cover 100 is generally round in shape with a single flat portion 102. The flat portion 102 is positioned so that it extends over the opening 78 in the wall 76. Therefore, only one or two of the teeth 92 from the counter wheel 84 will be visible when one views the top 22 of the housing.

During assembly of the clockspring 10, the hub 14 is positioned in the centered position with the pawl 72 pointing at the center of the opening 78 provided in the counter wall 76. In addition, while in the center position, the pawl 70 is straddled by the teeth 92 of the counter wheel 84 which are labeled "1 Counter" and "1 Clock."

Once assembled, the clockspring 10 is mounted onto a steering apparatus so that the housing 16 is attached to a non-rotating mounting structure (not shown) and the hub 14 is attached to a rotatable steering member (not shown) that passes through the second central aperture 40 of the hub 14. Since the hub 14 is connected to the rotatable steering member of the steering apparatus, the hub will rotate with the rotatable steering member. Whenever the hub 14 is rotated, the pawl 72 on the hub will engage the counter wheel 84 and advance it by one tooth per revolution of the hub. Therefore, only an incremental indication of the hub's position, with respect to the housing, is given by the centering display device.

For example, when the hub 14 is centered within the housing 16, the pawl 72 is straddled by the counter wheel teeth labeled "1 Counter" and "1 Clock." As the hub 14 moves in a clockwise direction depicted by arrow 104, the pawl 72 will begin to push against the "1 Clock" tooth of the counter wheel 84 so that the counter wheel will begin to move in a counterclockwise direction as depicted by arrow 106. As the pawl 72 continues to move in the clockwise direction, the counter wheel 84 will also continue to move in the counterclockwise direction until finally the pawl is released from engagement with the counter wheel and only one tooth of the wheel is exposed from underneath the counter cover 100. Accordingly, the tooth that is exposed from underneath the counter cover will display the label "1 Counter." In addition, as the hub 14 continues to move in a clockwise direction for almost one entire revolution, the pawl 72 will again engage and push against the exposed tooth of the counter wheel 84. The continued clockwise movement of the hub 14 will cause the counter wheel 84 to move in a counterclockwise direction until the pawl 72 is released from engagement with the counter wheel and the tooth labeled "2 Counter" is exposed from underneath the counter cover 100.

When the clockspring 10 is subsequently removed from the steering apparatus. The centering display device 12 will continue to display the number of turns, and the direction, required for returning the hub to a centered position. Thus, depending on the position indicated by the tooth of the counter wheel 84 exposed from underneath the counter cover 100, it can be determined if the hub 14 is centered or needs adjusting.

It should be understood that various changes and modifications to the presently preferred embodiments described herein will be apparent to those skilled in the art. For example, it may be desired to have two pawls positioned 180 degrees from each other on the hub so that the counter wheel will indicate within one-half turn the position of the hub relative to the clockspring housing. Further, the centering means may also include a locking means for preventing the rotation of the hub when a predetermined number of rotations of the hub have occurred. Such changes and modifications may be made without departing from the spirit and scope of the present invention and without diminishing its attendant advantages. It is, therefore, intended that such changes and modifications be covered by the appended claims.

I claim:

1. A clockspring comprising:
   a) housing having an outer radial wall and a top which extends perpendicularly from said outer radial wall, said radial wall having a maximum diameter;
   b) a hub rotatably mounted to said housing;
   c) a ribbon cable coiled around said hub and connected to said housing and said hub; and
   d) means contained within said maximum diameter and on both said top of said housing and said hub for incrementally indicating when said hub is centered with respect to said housing including a post mounted counter wheel rotatably attached to said top and a pawl mounted to said hub.

2. The clockspring of claim 1, wherein said indicating means comprises:
   a) a counter wheel; and
   b) a pawl.

3. The clockspring of claim 2, wherein said counter wheel is rotatably attached to said top and said pawl is mounted to said hub.

4. The clockspring of claim 3, further including means for preventing said counter wheel from rotating unless engaged by said pawl.

5. The clockspring of claim 4, wherein said prevention means comprises of a wave washer frictionally mounted against said top and said counter wheel.

6. The clockspring of claim 2, wherein a plurality of teeth extend from said counter wheel for incremental engagement with said pawl.

7. The clockspring of claim 6, wherein said hub can only be rotated a maximum number of revolutions before said ribbon cable becomes completely wrapped or unwrapped around said hub and said plurality of teeth are equal in quantity to said maximum number of hub revolutions.

8. The clockspring of claim 6, wherein each tooth is labeled to indicate direction of hub rotation needed for centering said hub with respect to said housing.

9. The clockspring of claim 6, wherein each tooth is labeled to indicate amount of hub rotation needed for centering said hub with respect to said housing.

10. The clockspring of claim 6, further including a counter cover mounted over said counter wheel so that no more than two teeth from said counter wheel are exposed at any given time.

11. A clockspring having a device for determining if said clockspring is centered, said clockspring comprising:
   a) a housing defining a first central aperture and said housing having a radial wall;
   b) a hub being carried in rotatable relation in said first central aperture;
   c) coiled conducting means having a first end and a second end with said first end being connected to a first connector carried by said housing, and said second end of said coiled conducting means being connected to a second connector carried by said hub; and
   d) means, mounted to said hub and said housing without extending over said radial wall, for indicating if said hub is centered with respect to said housing including a post mounted counter wheel rotatably attached to said top and a pawl mounted to said hub.

12. The clockspring of claim 11, wherein said indicating means comprises:
   a) a counter wheel; and
   b) a pawl.

13. The clockspring of claim 12, wherein said counter wheel is rotatably attached to said housing and said pawl is mounted to said hub.

14. The clockspring of claim 13, further including means for preventing said counter wheel from rotating unless engaged by said pawl.

15. The clockspring of claim 14, wherein said prevention means comprises of a wave washer frictionally mounted against said housing and said counter wheel.

16. The clockspring of claim 12, wherein a plurality of teeth extend from said counter wheel for incremental engagement with said pawl.

17. The clockspring of claim 16, wherein said hub can only be rotated a maximum number of revolutions before said coiled conducting means becomes completely wrapped or unwrapped around said hub and said plurality of teeth are equal in quantity to said maximum number of hub revolutions.

18. The clockspring of claim 16, wherein each tooth is labeled to indicate direction of hub rotation needed for centering said hub with respect to said housing.

19. The clockspring of claim 16, wherein each tooth is labeled to indicate amount of hub rotation needed for centering said hub with respect to said housing.

20. The clockspring of claim 16, further including a counter cover mounted over said counter wheel so that no more than two teeth from said counter wheel are exposed at any given time.

21. A clockspring having a device for determining if said clockspring is centered, said clockspring comprising:
   a) a housing defining a first central aperture and said housing having a radial wall;
   b) a hub being carried in rotatable relation in said first central aperture;
   c) coiled conducting means having a first end and a second end with said first end being connected to said housing, and said second end of said coiled conducting means being connected to said hub;
   d) a pawl mounted to said hub;
   e) a counter wheel rotatably attached to said housing and having a plurality of teeth which extend from said counter wheel for incremental engagement with said pawl; and
   f) a wave washer frictionally mounted against said housing and said counter wheel.

22. The clockspring of claim 21 further comprising a counter cover mounted over said counter wheel so that no more than two teeth from said counter wheel are exposed at any given time.

* * * * *